United States Patent [19]

Rosenfeld

[11] 4,350,996
[45] Sep. 21, 1982

[54] SCREENED IMAGE REPRODUCTION

[75] Inventor: Gideon Rosenfeld, Tel-Aviv, Israel

[73] Assignee: Scitex Corporation Ltd., Herzlia, Israel

[21] Appl. No.: 139,705

[22] Filed: Apr. 14, 1980

[51] Int. Cl.³ .............................................. H04N 1/46
[52] U.S. Cl. ......................................... 358/75; 358/78
[58] Field of Search ..................... 358/75, 76, 77, 78, 358/79

[56] References Cited

U.S. PATENT DOCUMENTS

3,657,472  4/1972  Taudt .................................... 358/75
3,911,480  10/1975 Brucker ................................. 358/75
4,084,183  4/1978  Keller ................................... 358/75

Primary Examiner—Michael A. Masinick
Attorney, Agent, or Firm—Cesari and McKenna

[57] ABSTRACT

To produce a screened color separation having any screen angle, an original picture is scanned to generate a set of picture values which are digitized and stored. Also a screen function is generated and stored representing a complete two-dimensional period of a halftone screen in the form of a grid-like array of grey-tone values, the mesh of the grid-like array being finer than the scanning raster. To expose a reproduction medium, the screen function values are superimposed on the picture values to develop exposure signals for an exposing plotter. The screen angle is selected by virtually rotating the stored screen function data through the selected angle as it is being recalled from memory.

18 Claims, 5 Drawing Figures

SCREENED IMAGE REPRODUCTION

This invention relates to screened image reproduction. It relates more particularly to method and apparatus for making a screened reproduction of an image at any selected screen angle.

BACKGROUND OF THE INVENTION

In electronic image reproduction it is well known to mount a picture original on a rotary drum and helically scan the original with a light source in a scanning head which traverses the drum. The reflected light from the original is conducted by way of different color filters to photoconductors whose electrical outputs thereupon represent the tonal densities of the measured colors in each pixel comprising the original. These electrical outputs are digitized and then used to control an exposing scanner or plotter whose drum carries a recording medium such as a light-sensitive film which is scanned and exposed in accordance with the aforesaid picture signals.

Color images for pictures are typically reproduced in half-tone copy through the use of a separate black-and-white half-tone film or separation for each color to be reproduced. Each separation carries a pattern of dots which are spaced along a screen line with the dots being of various sizes in accordance with the grey-tone levels for the particular color component of the original to be reproduced.

In the production of such half-tone color separations or films, it is known to scan the picture original and to superimpose on the picture signal screen signals corresponding to a vignetted contact screen. The difference signals are thereupon applied to the plotter which exposes the film. The film has a selected sensitivity threshold so that the size of each exposed dot on the film varies directly with the local picture brightness for that particular color.

As is well known, an interference pattern or Moire effect is caused by the screen line patterns of the half-tone dots when a plurality of such half-tone color images are printed over one another to reproduce the color original. In order to minimize Moire, the grid structures of the respective color separations necessary for the reproduction of a multicolor picture original should be rotated relative to one another by selected angles. Typically in the graphic arts industry, the screen lines for the color black are oriented at 45 degrees, those for cyan at 15 degrees, those for yellow at 0 degrees and those for magenta at 75 degrees (or −15 degrees).

There has already been proposed the dot-by-dot and line-by-line rastered recording of picture signals obtained by scanning a picture original. This includes superimposing the picture signals on raster signals such as are produced by scanning, at a finer resolution than that used for the picture scanning, a screen having an internal structure defined by mutually perpendicular sets of lines rotated at an angle relative to the direction of scanning of the original, which angle has a rational tangent. The raster signals are obtained and stored in a memory. The contents of the memory are then called up in a periodic fashion, picture line by picture line, as the original picture is being recorded and are superimposed on the picture signals. The combined signals are then used to control a plotter which exposes the reproduction medium. An arrangement such as this is shown for example in U.S. Pat. No. 3,657,422.

That technique for making screen separations is disadvantaged, however, in that it requires that there be used screen angles which have rational tangents, rather than the screen angles preferred by the graphic arts industry which do not necessarily have rational tangents. Thus, for example, in order to practice that prior method, one must use odd screen angles such as 14.03 degrees, 18.4 degrees and 22.5 degrees. Such angles are not the optimum angles for achieving the best quality reproduction of color originals. Moreover, in the apparatus described in that patent, the vignetted screen must have a pyramid-type cell configuration, whereas in many printing applications other cell configurations, Respi and split-dot, for example, are more preferable. Finally, prior arrangements of that general type are not as versatile as they might be in their ability to change the shape and size of the screen cells for different reproduction applications.

SUMMARY OF THE INVENTION

Accordingly, it is an object of the present invention to provide an improved method and means of producing half-tone separations for color image reproduction.

Another object is to provide apparatus capable of making a color separation of a color original at substantially any selected screen angle.

A further object of the invention is to provide such apparatus whose half-tone screen cells can assume a wide variety of different shapes and sizes to suit different reproduction needs.

A further object of the invention is to provide apparatus for making a screen reproduction of an image which can produce a plurality of color separations with a single scan of the picture original.

Other objects will, in part, be obvious and will, in part, appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

Briefly, in accordance with the present technique, a picture original is mounted on a conventional rotary drum scanner and scanned helically picture element (pixel) by picture element (pixel) and line by line or in multiple lines in the usual way to develop a succession of picture signals representing the tonal densities of the color components (e.g. red, yellow, blue, etc.) in the pixels comprising the color original. The color signals for each pixel are digitized and stored in a pixel memory at an address which corresponds to the geometric location of that pixel in the scan.

To generate the required half-tone separations to reproduce the color original, the pixel data for each color is read from memory and superimposed on screen signals to produce exposure signals. These last signals are, in turn, applied to control the exposure of film mounted in a conventional drum-type exposure scanner or plotter. Thus to generate four half-tone separations (e.g. yellow, magenta, cyan and black), four plotter scans are required unless a multiple head plotter is used. Alternatively four film sections can be mounted around the drum and the screen angles for the different film sections selected automatically, as the drum revolves.

However, rather than generating a set of screen signals by scanning a vignetted contact screen simultaneously with, or separately from, the scanning of the color original, as done heretofore, the screen signal set is computed directly. More particularly, a digital representation of a vignetted screen is constructed composed of a set of numbers representing the grey-tone values in the cells comprising the screens and those numbers are stored in memory.

As will be discussed in greater detail later, the screen has a microstructure so that each screen cell is actually composed of several microcells, each of which is assigned a grey-tone value number. Accordingly, in order to store the screen information for an entire screen large enough to be superimposed virtually on the picture original, an excessively large memory would normally be required. However, it is a characteristic of such contact screens that they are periodic in both dimensions. Accordingly, the present apparatus only stores the screen data or grey-tone value numbers for one period of the screen. This data, defined herein as the screen function, can be accommodated in any reasonably sized high-speed, random access memory. For example, the screen function of a screen that is periodic in the basic othogonal directions, e.g. a screen having a screen angle of zero degrees, may be stored. The grey-tone value numbers are stored in an array of addressable memory locations corresponding to their geometric locations with respect to the screen grid coordinates.

During exposure of the reproduction medium, data numbers representing the picture signals are read out of memory in synchronization with grey-tone numbers representing the screen function. Electrical analogs are developed and superimposed to produce the exposure signals for the plotter, which thereupon exposes the reproduction medium resolution element by resolution element and line by line.

Since the picture signals and the screen function are developed independently, as is known, the color separation film can be exposed with a much finer raster than that of the scanning raster of the picture scanner permitting the exposed resolution elements on the film in the plotter to be much smaller than the scanned pixels in the original. Then, while combining the picture and screen signals for exposure, a fine-line raster format for exposure can be created by repeatedly superimposing the same picture signal for a given pixel on a succession of screen signals, the number of such repetitions depending upon the relative sizes of the pixels and the screen microcells.

Thus assume, for example, that the present system scans or samples a two-dimensional color original in a given resolution or grid and that each step, i.e. the distance between adjacent pixels, is defined as a scanning step (SS). Assume also that the screen function representing one period of each dimension of a two-dimensional half-tone screen is generated and stored in an m-by-n memory matrix and that the distance between each entry in the matrix is defined as a screen step (CS) which can be any selected value. Finally, assume that the system exposes the reproduction medium or film in a plotter where each cell of the picture is composed of resolution elements or dots which correspond to the resolution of the plotter and that the distance from one such resolution element to the next is defined as an exposure step (ES). Three basic grids or matrices are thus defined, namely a scanning grid, an exposing grid and a screen grid.

As noted previously, each screen cell step (CS) may be much smaller than an exposing step (ES), the ratio of the two being defined as S (i.e., S=ES/CS). Also as stated, each exposing step (ES) is desirably smaller than each scanning step (SS), the ratio of those two values being defined as d (i.e., d=SS/ES).

To generate each color separation, the screen grid is virtually superimposed on the picture grid. In other words, the sets of numbers representing the tonal density values of the picture are superimposed on the grey-tone value numbers representing one period of the screen. The corresponding numbers are then compared and used to produce exposure signals. Thus if the output is constructed line by line where the lines are in the Y coordinate direction (i.e. circumferentially around the scanner drum), the tonal value of each pixel recovered from the pixel memory is compared with proper entry in the screen function memory. If the pixel value or number is greater than the screen function number, a command is issued to the plotter to expose a corresponding resolution element on the recording medium. On the other hand, if the pixel number is less than the screen function number, there is no such command issued to the plotter and that resolution element is not exposed.

This sequence is repeated for several resolution elements as determined by the value of d, where each time a new entry in the screen function memory matrix is chosen, depending upon the value of S, while the same pixel is used for comparison. Then, the next pixel in a line is selected and the process is repeated until the end of a line. After one line (plotter drum revolution) is completed, the next line proceeds following the same sequence, still using the same line of pixels for comparison. After one line of pixels has been reproduced, the screen function entries are compared with the pixel numbers in the next line, and so on. Thus there is produced on the recording medium a black and white reproduction of the original composed of transparent dots whose sizes correspond to the local picture brightness of a particular color.

As alluded to previously, each different color separation requires a different screen angle. The present apparatus is able to generate screen functions representing a screen oriented at substantially any angle from the single, stored, zero angle screen function by virtually rotating the screen memory matrix relative to the pixel memory matrix, using the standard trigonometric calculation for a rotated coordinate system, as the information from those two memories is read out to expose the film. Thus the system calculates each succeeding rotated address M′, N′ in the screen memory in accordance with the following relationships, assuming each address increment equals one cell step (CS) in the basic screen:

$$M' = M + S \sin A, \text{ and} \tag{1A}$$

$$N' = N + S \cos A \tag{1B}$$

where:
 M and N are the components of the present address in the screen memory matrix,
 S is the ratio of the exposing step (ES) to the screen cell step (CS), and
 A is the selected screen angle.

The content of each such rotated screen memory location becomes a screen signal which is compared with a picture number as described above to produce a command for the plotter instructing it to expose or not expose a particular resolution element on the film separation.

Since data representing only one screen period is stored, the calculated rotated address component M' or N' may be greater than a dimension m or n of the screen memory matrix. However, since the screen is composed of endless repeats of the stored screen function representing a single screen period, the proper rotated screen memory address components may be expressed in terms of:

$$M^* = M' \bmod m, \text{ and} \tag{2A}$$

$$N^* = N' \bmod n \tag{2B}$$

where: mod m and mod n signify the address calculations as being of modulo m and modulo n respectively
Thus, starting from a selected location on the screen, the system computes the succeeding screen function memory addresses according to Equations 1A, 1B, 2A and 2B.

After the plotter has exposed one line of resolution elements in the Y (circumferential) direction, the system computes the screen memory address for exposing the first resolution element in the next plotting line in much the same manner in accordance with the following relationships:

$$M_{st^*} = M_{st} + S \cos A \bmod m \tag{3A}$$

$$N_{st^*} = N_{st} - S \sin A \bmod n \tag{3B}$$

where: $M_{st}, N_{st}$ is the address in the screen function memory matrix used to expose the first resolution element in the present line.

Then using $M_{st}$, $N_{st}$ as the starting address for that line, the system computes the screen function memory addresses corresponding to the succeeding microcells in that line following Equations 2A and 2B above.

Since the screen may be oriented at any angle A, the values S sin A and S cos A and therefore M, N, $M_{st}$ and $N_{st}$ may not be integers. Accordingly, the system treats each M, N, $M_{st}$ and $N_{st}$ as a number composed of integer and fractional parts. The system's processor computes each succeeding screen function memory address in accordance with the aforesaid relationships using the entire number for M or $M_{st}$ or N or $N_{st}$. However, for purposes of addressing the screen function memory, only the integer part is considered. In other words, the system essentially rounds off each computed memory address downward to the nearest actual location in the screen function memory. This screen address computing process is carried out to expose each resolution element dot by dot, line by line until the color separation is completed.

The numbers m and n depend upon the desired precision in the screen function. The larger their values (i.e. the smaller the value of CS), the finer the sampling of the screen function and the less the root-mean-square error caused by the aforesaid rounding off operation. As a general rule, m and n should be much larger than the number of resolution elements in one period (in each dimension) of the plotted screen. In other words, the ratio S as defined above should be considerably greater than 1 in order to obtain good density resolution in the color separation. The maximum useful value of S is bounded by the grey-tone value resolution of the screen function, i.e. the point at which pairs of adjacent screen microcell locations in the memory matrix (in the m and n directions and in the two diagonal directions) contain half-tone values which differ by, at most, one binary level.

Finally in order to minimize any artifacts that may arise due to the aforesaid rounding off process, the system adds a random number to each screen memory address calculation. This insures that the resultant screen separation is characterized by minimum Moire and minimum occurrence of serrations at the boundaries between adjacent colors in the finished half-tone reproduction.

It will be apparent from the foregoing that a screen separation of any angle may be produced simply by substituting different S cos A, S sin A values in the above address calculations. These values may be stored in sine and cosine look-up tables in the computer memory. Likewise, a screen of substantially any mesh, i.e. microcell step (CS), may be generated from the same stored screen function simply by appropriately scaling the ratio value S. Moreover, because of the aforesaid mode of effecting virtual rotation of the screen function, the scaling factor, as well as the value of S itself, need not be a rational number. This also means that the values SS, ES and CS as defined above may be different in the vertical and horizontal directions (m, n). In other words, the screen microcells and the resolution elements may be rectangular rather than square. Thus, the present system is extremely versatile in that, with a minimum amount of stored information, it can produce screen separations having a wide variety of different screen meshes and angles. Furthermore, these angles can be those preferred by the graphic arts industry, many of which do not have rational tangents. Accordingly, the system should find wide application in that industry.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
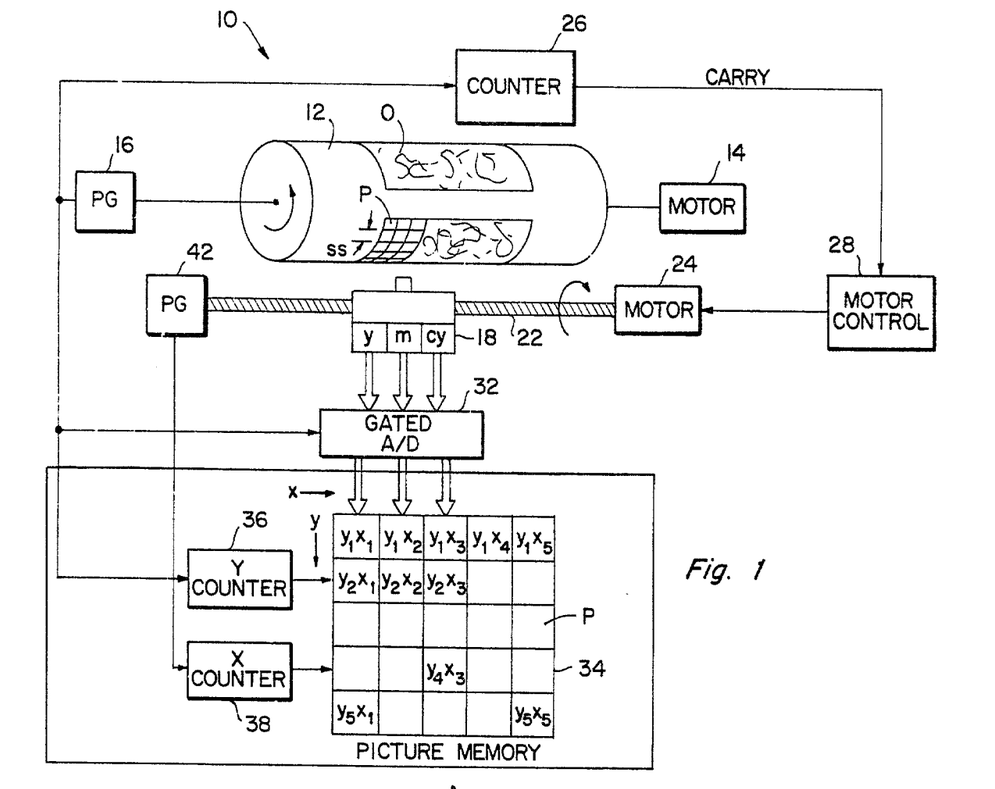
FIG. 1 is a diagrammatic view of a scanner for generating picture signals for use in producing screen separations in accordance with this invention.

Referring to FIG. 1 of the drawings, the present system utilizes picture signals provided, for example, from a scanner indicated generally at 10. A typical scanner includes a drum 12 on which is mounted the color original 0 which is to be reproduced. The drum 12 is rotated counterclockwise in the direction indicated by the arrow on the end of the drum by a motor 14. A position encoder 16 which is responsive to drum rotation emits a train of signals indicating the instantaneous angular position of the drum during each revolution thereof. Scanner 10 also includes a scanner head 18 mounted on a lead screw 22 adjacent drum 12. The lead screw is rotated by a step motor 24 so that as the drum 12 rotates, the scanner head 18 travels axially along the drum.

The signals from encoder 16 are applied by way of a counter 26 to a motor control 28. Output signals from the motor control are applied to motor 24. The counter counts signals representing a complete revolution of the drum and thereupon issues a signal to control 28 which causes the motor 24 to increment the head to the next scan line. Thus the movements of the head 18 and the drum 12 are coordinated so that the head scans the color original O pixel by pixel and line by line.

As is usual in scanners of this type, the head 18 illuminates each pixel of the scanned original and the reflected light is transmitted by way of color filters to photosensors located in the head. During each scan, the head 18 develops electrical signals representing the color components of each pixel in the scanned original. These electrical signals are applied by way of a gated A/D converter 32 to a pixel memory 34, the converter 32 being gated by the signals from encoder 16. Memory 34 is addressed by signals from a Y address counter 36 which responds to signals from encoder 16 and by an X address counter 38 which responds to signals from an encoder 42 driven by lead screw 22. Thus, as the scanner 10 scans the original O, the head 18 generates electrical signals reflecting the tonal density values of the color components in each pixel P of the original. This information is digitized and stored in memory 34 so that the color information for each pixel is stored in the memory at locations (designated X,Y in FIG. 1) which corresponds geometrically with the location of the pixel on the original O.

The present system also develops screen data for superposition on the picture data stored in memory 34. This screen data is stored in a screen memory 46 which is illustrated diagrammatically in FIG. 2. Memory 46 comprises an m-by-n array or matrix which is addressed and loaded by the system computer. The information stored in memory 46 is an array of numbers corresponding to the grey-tone values of a half-tone screen. Since such screens are periodic in both dimensions, the memory 46 need only be large enough to hold the screen function information representing one period of the screen in two dimensions. The various numbers stored in memory 46 are preferably computed directly. However, they may be obtained by scanning a vignetted contact screen with a scanner similar to the one illustrated in FIG. 1. In any event, the stored screen function may have any one of a wide variety of configurations corresponding to a Respi screen, a split-dot screen, a pyramid-type screen or any of the other screens preferred by the graphic arts industry.

Figure 5:
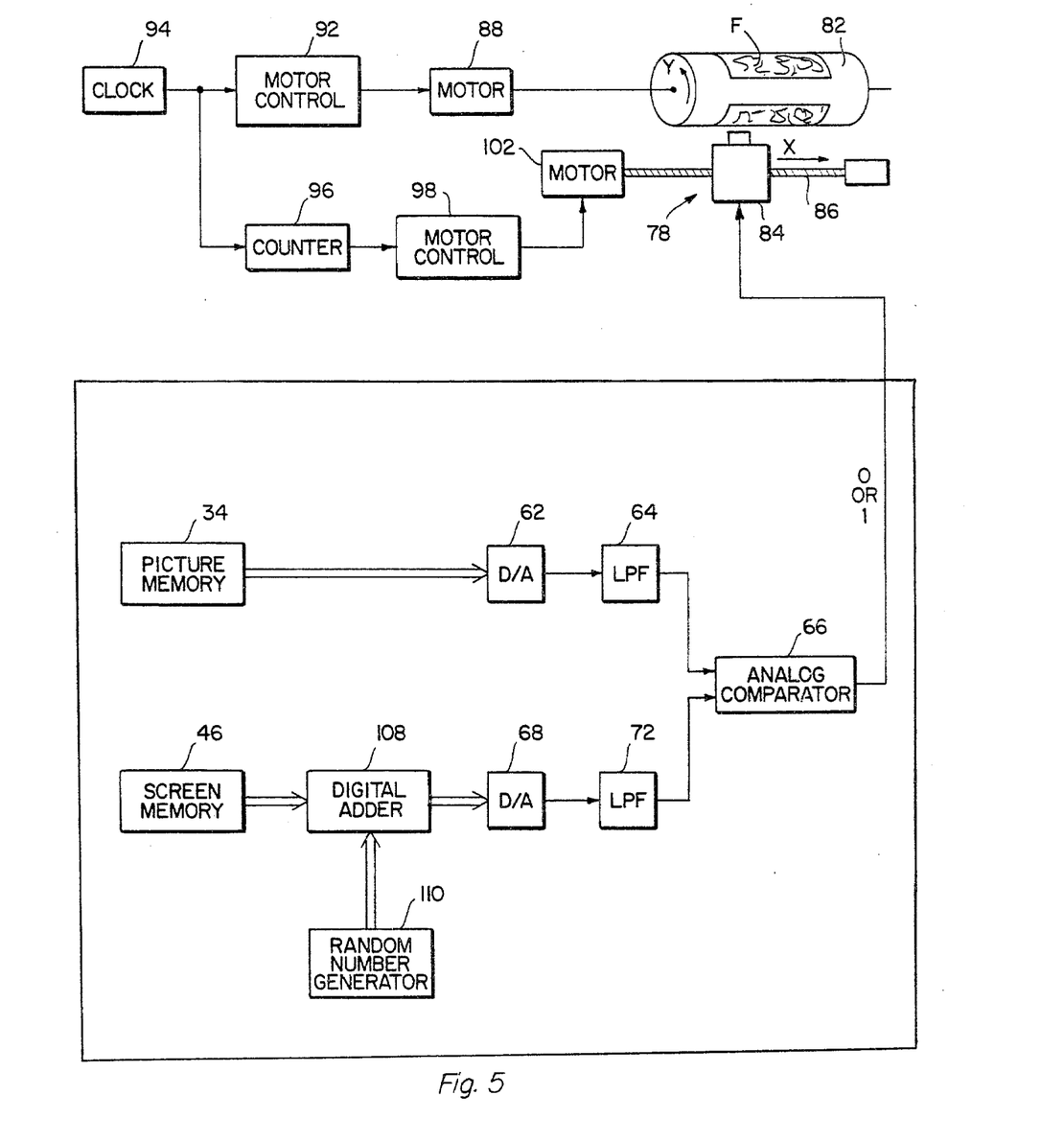
FIG. 5 is a diagrammatic view illustrating apparatus for exposing screen separations in accordance with this invention.

For ease of illustration and explanation we have shown the scanner 10 connected directly to various counters and memories. In actual practice, however, the functions of all these elements are implemented as software or hardware in a general or special computer D with the picture signals being read into the computer from tape or disk storage. The interfaces of the input and output devices with the computer are indicated in FIGS. 1 and 5.

Figure 2:
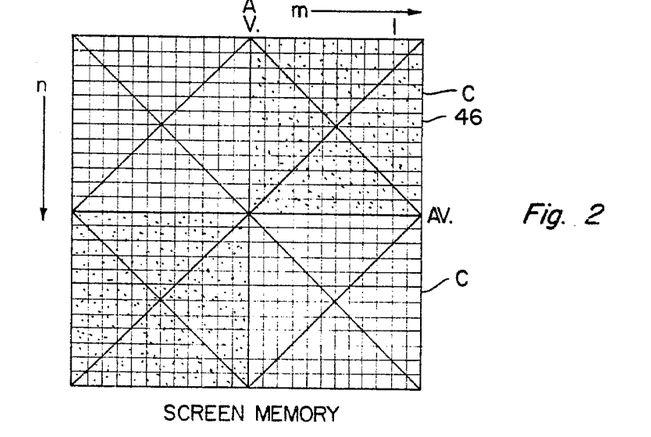
FIG. 2 is a diagrammatic view of a stored screen function for producing the screen separations.

Also for purposes of illustration, we have shown the memory 46 in FIG. 2 as containing a screen function representing a pyramid-type screen. That screen is composed of cells whose grey-tone values vary in accordance with the profiles of four-sided pyramids extending in opposite directions about an average value. Thus there are shown diagrammatically in the memory 46 in FIG. 2 four such pyramid-shaped cells C. Two of the cells are stippled indicating that they extend down into the paper, whereas the unstippled cells project up from the paper. One complete period of such a screen contains four such cells C as indicated. Conceptually, the screen may be extended indefinitely in both directions by repeating the period.

Figure 3:
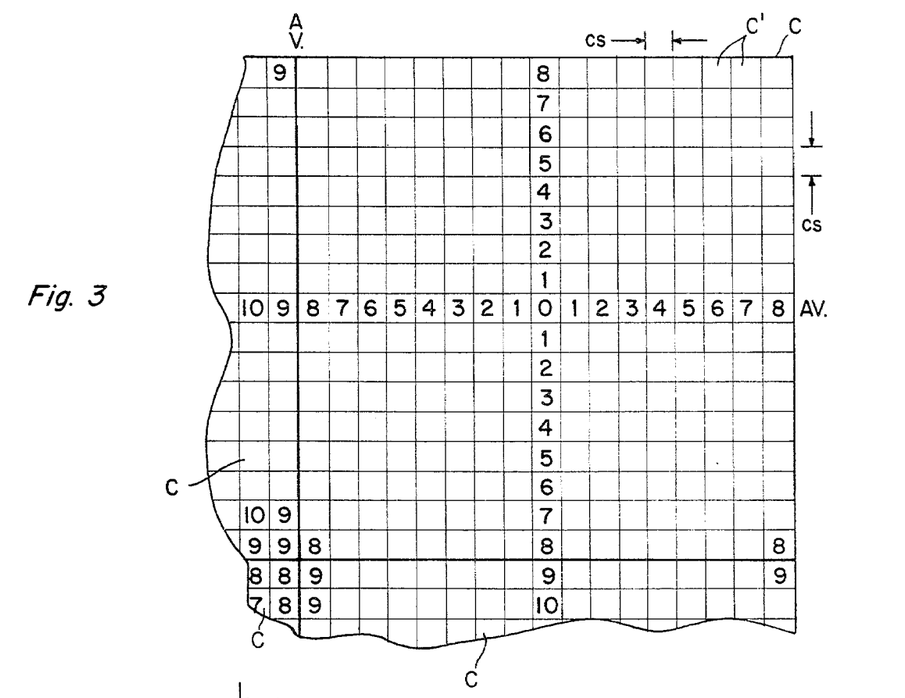
FIG. 3 is a similar view illustrating the microstructure of the screen function in FIG. 2.

Refer now to FIG. 3 which illustrates one such cell C in greater detail. As shown there, the cell has a grid-type microstructure in that it is composed of a multiplicity of small microcells C', the step distance between such microcells in the m and n directions being designated CS. The array of microcells C' illustrated in FIG. 3 also represents diagrammatically the array of memory locations in the screen memory 46. In other words, the memory locations correspond to the locations of the various microcells in the screen function. Furthermore, the information stored at each memory location represents the grey-tone value of the corresponding microcell in the screen function. Thus in the case of the illustrated pyramid-type screen, the grey-tone values run from a minimum value at the center of the upper right-hand cell to an average value at the perimeter of that cell. Consequently, the numbers stored in the screen memory array have a minimum value of, say, zero at the center location corresponding to the tip of the downwardly-extending pyramid to a maximum value of eight at the screen memory locations corresponding to the microcells at the perimeter of cell C. It should be understood at this point that the screen function numbers shown are simply for purposes of explanation. An actual screen function would be composed of a larger number of microcells containing many gradations of grey-tone values.

The upper left-hand and lower right-hand cells C represent positive or upwardly-extending grey-tone value pyramids. Accordingly, the memory locations corresponding to the perimeters of those cells contain the number 9, for example. Larger numbers are contained in the memory locations corresponding to microcells closer to the centers of those cells, with the maximum number being contained in the memory locations corresponding to the center microcell in each of those cells. The lower left-hand cell C represents a negative-going pyramid and is essentially a copy of the cell C fully illustrated in FIG. 3.

Thus the screen function stored in memory 46 is a digital representation of a complete period of a contact screen oriented at a selected angle, say zero degrees. If the screen is virtually superimposed over a relatively weak light source, it will transmit light in the form of relatively small spots corresponding to the centers of the negative-going pyramid-type cells and of a brightness sufficient to expose the reproduction medium. As the light source becomes stronger, those spots become larger. If the light source exceeds the average value, the positive-going cells will transmit light near their perimeters until finally, for a very strong light, the entire screen period is transmissive to the light of sufficient brightness to expose the reproduction medium.

Figure 4:
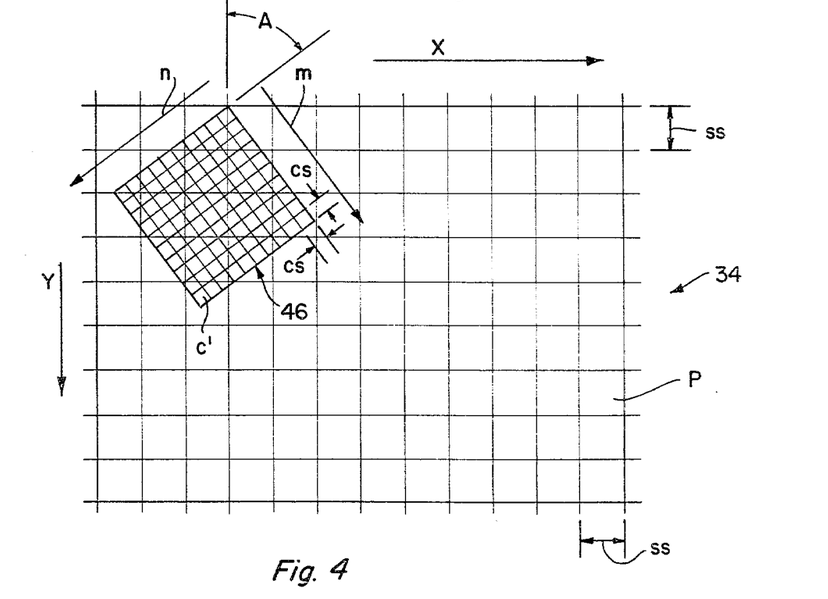
FIG. 4 is a diagrammatic view illustrating the operation of the apparatus.

In accordance with the present invention, the screen function for a particular color stored in memory 46 is virtually superimposed on the picture function for that color stored in memory 34. This superposition is illustrated diagrammatically in FIG. 4. The distance between each pixel P and the next is designated SS and the distance between each microcell C' and the next is designated CS. Since different color screen separations require different screen angles, the screen function 46 illustrated in the figure is oriented at angle A with respect to the picture function 34.

The section of the present system which compares the contents of memory 46 with the contents of memory 34 to properly expose the reproduction medium is illustrated in FIG. 5. As noted previously, while we have shown specific functional boxes in order to explain the invention, these functions are actually implemented as hardware or software in a computer D. Data read out of the computer is then stored and used as desired to control an exposure device such as a plotter.

Each time the picture memory 34 is addressed, information representing the color information of the pixel corresponding to that memory location (or at least that portion thereof pertaining to the color in question) is read into a digital-to-analog converter 62. The output of the converter is applied by way of a low-pass filter 64 to an analog comparator 66. The memory 34 is addressed so that the information is preferably read out of the memory pixel by pixel and line by line exactly as the color original O was initially scanned.

As the information for each pixel is being read out of memory 34, the system computes the memory 46 addresses corresponding to a succession of microcells C' (the number in the succession depending upon the value of d) in accordance with Equations 2A, 2B and 3A, 3B above. The data from these locations are applied to digital-to-analog converter 68. What we do, then, is reconstruct the original analog picture and cell information. The signal from that converter is thereupon coupled by way of a low-pass filter 72 to the analog comparator 66. The comparator thereupon applies a binary output to a binary plotter shown generally at 78 to control the exposure of a film F.

The plotter 78 is more or less standard. It comprises a rotary drum 82 on which the film F is mounted. Positioned adjacent the drum is an exposing head 84 which carries a light source such as a laser and which travels along the drum on a lead screw 86. The drum is rotated at a constant speed by a motor 88 controlled by a motor controller 92 responsive to pulses from the system clock 94. The clock 94 also applies pulses by way of a counter 96 to a motor control 98 which controls a lead screw motor 102. Movements of the drum 82 and the head 84 are such that the head 84 scans the film F around the circumference of the drum and from left to right in much the same manner as the scanner 10 scans the picture original O (FIG. 1). However, it scans on a much finer raster than the scanner 10, (i.e. d is greater than unity), in order to minimize the storage requirements of the picture memory 34. Also, the dimension (CS) of each microcell in the screen is much smaller than the dimension of each resolution element (ES) of the plot, (i.e. S much greater than unity), in order to achieve optimum density resolution in the final screen separation.

As the plotting head 84 scans each resolution element in film F, the exposing head receives an instruction from comparator 66 as to whether or not to expose that resolution element. If, for a given resolution element, the voltage applied to comparator 66, corresponding to the data from the picture memory 34, exceeds the voltage applied thereto, corresponding to the screen data from memory 46, comparator 66 issues an expose command (i.e., binary 1) to the plotter head 84. On the other hand, if the former voltage does not exceed the latter voltage, then no such expose command (i.e. a binary 0) is issued to the plotter. Thus as the plotter 78 scans the film F resolution element by resolution element and line by line or several lines at a time, picture information and screen information are read from memories 34 and 46, that information is compared and a decision is made as to whether or not to expose each resolution element in the plotter scan.

As mentioned above, the computed values of Ssin A and Scos A may not be integral numbers because angle A, as well as S, may assume substantially any value. Therefore, the system computer, after computing each successive memory 46 address following the above equations, uses only the integer portion of that number to designate the nearest actual memory address. Obviously, the higher the resolution of the screen function (i.e. the smaller the CS and the higher the S), the smaller the error resulting from this rounding-off operation. Alternatively, the system computer could if desired round off each computed address up or down to the nearest actual address.

Actually the present technique permits the ratio S to be quite small (i.e. 1 or even less), while still obtaining a relatively small rms error resulting from the aforesaid rounding-off operation. This simply involves applying each computed screen memory 46 address to several (e.g. 4 or more) nearest addresses in the screen memory and interpolating or averaging the screen function data read from those locations to produce the exposure command signal for the plotter.

In any event, the aforesaid rounding-off operation does introduce a small error into the screen function that is superimposed on the picture function. This error may be reflected as Moire in the resultant color reproduction which pattern may be noticeable particularly at the boundary between adjacent colors in the reproduction. To avoid this, a small amount of noise may be introduced into the grey tone value from each screen memory location calculated as described above. This is installed in FIG. 5 wherein a digital adder 108 is interposed between memory 46 and converter 68. Adder 108 also receives the output of a random number generator 110. Thus each screen signal from converter 68 which is compared with the picture signal from converter 62 includes a small random component which substantially eliminates the aforesaid Moire.

Alternatively, to produce the same beneficial effect, a small amount of digital noise can be added to each calculated address of the screen function memory before the rounding-off operation to determine the actual memory location to be addressed as discussed above.

Due to practical hardware considerations, the resolution elements exposed by the plotter 78 may not be square, i.e. ES may be different in the X and Y directions. However, this does not affect the aforesaid calculation of the addresses for the rotated screen because m need not be equal to n, i.e. the screen cells C' need not be square either so that CS may be different in the two basic directions. Also it will be apparent from the above Equations 2 and 3 that from the single stored screen function a screen of any mesh size (resolution) can be generated simply by multiplying the value S by a scale factor, i.e. the higher the scale factor, the finer the screen mesh. Since the computed screen memory addresses can be rounded off, S and the scale factor can be non-integral and even irrational. Likewise for the same reason the ratio d of the pixel step size (SS) to the exposure step size (ES) can be non-integral or irrational.

Finally, while we have described a system which exposes only one film line at a time, the system can obviously be modified to process the information required to expose several film lines simultaneously. This simply involves computing and updating several screen addresses simultaneously and comparing the data at those locations with the appropriate pixel data as described above.

It will thus be seen that the objects set forth above, among those made apparent from the preceding description, are efficiently attained. Also, certain changes may be made in the above sequence of steps and in the above construction without departing from the scope of the invention. For example, the grey-tone values for a given screen function can be computed continually for comparison with the picture signals, said computations being repeated on the modulo m, modulo n basis described above. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. The method of producing a screened color separation having any screen angle (A) comprising the steps of
   A. scanning a color original pixel by pixel and line by line to produce a set of picture values, the adjacent scan lines having a selected step (SS) between them,
   B. digitizing and storing said picture values,
   C. scanning and exposing a reproduction member resolution element by resolution element and line by line in response to exposure signals, the adjacent exposure scan lines having a selected step (ES) between them,
   D. generating screen values representing the grey-tone values in a complete period in the orthogonal directions (m and n) of a periodic half-tone screen, said screen period being in the form of a grid defined by orthogonal m and n rulings, the distance between adjacent rulings having a value (CS) less than (ES), the different screen values being assigned to different locations in the grid,
   E. storing the screen values in a memory matrix at locations having memory addresses corresponding to the locations of the screen values in the grid,
   F. recalling the screen values from the memory matrix by
     (1) computing the memory address components corresponding to each memory location in accordance with the following equations:

$$M^* = M + S \sin A \bmod m$$

$$N^* = N + S \cos A \bmod n$$

$$M_{st}^* = M_{st} + S \cos A \bmod m$$

$$N_{st}^* = N_{st} - S \sin A \bmod n$$

wherein:
   M and N are the components of the present address in the memory matrix,
   S is the ratio of the exposing step (ES) to the screen cell step (CS),
   $M_{st}$ and $N_{st}$ are the components of the address in the memory matrix used to expose the first resolution element in the present line, and
   mod m and mod n signify the address calculations using modulo m and n arithmetic, and
     (2) rounding off each computed memory address component $M^*$, $N^*$, $M_{st}^*$, $N_{st}^*$ to a whole number corresponding to an actual memory address before addressing the memory matrix,
   G. recalling the picture values in the order in which the picture was scanned, and
   H. comparing the recalled screen values with the recalled picture values to produce said exposure signals for exposing the reproduction member.

2. The method defined in claim 1 wherein the ratio of ES to CS is substantially greater than unity.

3. The method defined in claim 1 wherein the ratio of SS to ES is greater than unity.

4. The method defined in claim 1 wherein said rounding-off step is accomplished by utilizing only the integer part of each computed memory address component to address the memory matrix.

5. The method defined in claim 1 and including the additional step of adding a random number to each computed memory address component prior to said rounding-off step.

6. The method defined in claim 1 wherein the value of CS is different in the m and n directions.

7. The apparatus for producing a screened color separation having any screen angle (A) comprising
   A. means for scanning a color original pixel by pixel and line by line to produce a set of picture values, the adjacent scan lines having a selected step (SS) between them,
   B. means for digitizing and storing said picture values,
   C. means for scanning and exposing a reproduction member resolution element by resolution element and line by line in response to exposure signals, the adjacent exposure scan lines having a selected step (ES) between them,
   D. means for generating screen values representing the grey-tone values in a complete period in the orthogonal directions (m and n) of a periodic half-tone screen, said screen period being in the form of a grid defined by orthogonal m and n rulings, the distance between adjacent rulings having a value (CS) less than (ES), the different screen values being assigned to different locations in the grid,
   E. means for storing the screen values in a memory matrix at locations having memory addresses corresponding to the locations of the screen values in the grid,
   F. means for recalling the screen values from the memory matrix, said means including
     (1) means for computing the memory address components corresponding to each memory location in accordance with the following equations:

$$M^* = M + S \sin A \bmod m$$

$$N^* = N + S \cos A \bmod n$$

$$M_{st}^* = M_{st} + S \cos A \bmod m$$

$$N_{st}^* = N_{st} - S \sin A \bmod n$$

where:

- M and N are the components of the present address in the memory matrix,
- S is the ratio of the exposing step (ES) to the screen cell step (CS),
- $M_{st}$ and $N_{st}$ are the components of the address in the memory matrix used to expose the first resolution element in the present line, and P2 mod m and mod n signify the address calculations using modulo m and n arithmetic, and (2) means for rounding off each computed memory address component $M^*$, $N^*$, $M_{st^*}$, $N_{st^*}$ to a whole number corresponding to an actual memory address before addressing the memory matrix, G. means for recalling the picture values in the order in which the picture was scanned, and H. means for comparing the recalled screen values with the recalled picture values to produce said exposure signals for exposing the reproduction member.

8. The apparatus defined in claim 7 wherein the ratio of ES to CS is substantially greater than unity.

9. The apparatus defined in claim 7 wherein the ratio of SS to ES is greater than unity.

10. The apparatus defined in claim 7 wherein said rounding-off means includes means for applying only the integer part of each computed memory address component to address the memory matrix.

11. The apparatus defined in claim 7 and further including the means for adding a random number to each computed memory address component prior to said rounding-off step.

12. The apparatus defined in claim 7 wherein the value of CS is different in the m and n directions.

13. The method of producing a screened color separation having any screen angle (A) comprising the steps of:

A. producing a set of picture values representative of a color original which is scanned pixel by pixel and line by line in a raster format;

B. generating a set of screen values representing the grey-tone values of a complete period in two dimensions of a half-tone screen which
  (1) is periodic in said two dimensions,
  (2) is oriented at a reference angle, and
  (3) has a finer mesh than the scanning raster;

C. storing the screen values in a memory at locations therein having memory addresses corresponding to their locations in the screen;

D. scanning and exposing a reproduction member resolution element by resolution element and line by line in response to exposure signals;

E. generating a succession of said screen value memory addresses;

F. processing each said generated address with a rotated coordinate system mathematical transformation to develop a succession of transformed memory addresses corresponding substantially to said locations in said screen when oriented at a selected angle relative to said reference angle;

G. addressing the memory using the transformed memory addresses to recall screen values from the memory; and H. comparing the picture values with the recalled screen values to produce said exposure signals for exposing the reproduction member.

14. The method defined in claim 13 and including the additional step of rounding off each memory address by utilizing only the integral part of each computed memory address to address the memory.

15. The method defined in claim 14 including the additional step of adding a random number to each computed memory address.

16. Apparatus for producing a screened color separation having any screen angle (A) comprising:

A. means for producing a set of picture values representative of a color original which is scanned pixel by pixel and line by line in a raster format;

B. means for generating a set of screen values representing the grey-tone values of a complete period in two dimensions of a half-tone screen which
  (1) is periodic in said two dimensions,
  (2) is oriented at a reference angle; and
  (3) has a finer mesh than the scanning raster;

C. means for storing the screen values in a memory at locations therein having memory addresses corresponding to their locations in the screen;

D. means for scanning and exposing a reproduction member resolution element by resolution element and line by line in response to exposure signals;

E. means for generating a succession of said screen value memory addresses;

F. means for processing each said generated address with a rotated coordinate system mathematical transformation to develop a succession of transformed memory addresses corresponding substantially to said locations in said screen when oriented at a selected angle relative to said reference angle;

G. means for addressing the memory using the transformed memory addresses to recall screen values from the memory; and H. means for comparing the picture values with the recalled screen values to produce said exposure signals for exposing the reproduction member.

17. The apparatus defined in claim 16 and further including means for rounding off each memory address by utilizing only the integral part of each computed memory address to address the memory.

18. The apparatus defined in claim 17 and further including means for adding a random number to each computed memory address.

* * * * *